United States Patent
Jamison et al.

(10) Patent No.: US 12,129,723 B2
(45) Date of Patent: Oct. 29, 2024

(54) MANAGING DIELECTRIC PROPERTIES OF PULSED POWER DRILLING FLUIDS

(71) Applicant: Halliburton Energy Services, Inc., Houston, TX (US)

(72) Inventors: Dale E. Jamison, Humble, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 16/771,087

(22) PCT Filed: Jan. 10, 2018

(86) PCT No.: PCT/US2018/013175
§ 371 (c)(1),
(2) Date: Jun. 9, 2020

(87) PCT Pub. No.: WO2019/139576
PCT Pub. Date: Jul. 18, 2019

(65) Prior Publication Data
US 2021/0071489 A1 Mar. 11, 2021

(51) Int. Cl.
*E21B 21/08* (2006.01)
*B01D 21/26* (2006.01)
(Continued)

(52) U.S. Cl.
CPC ............ *E21B 21/08* (2013.01); *B01D 21/262* (2013.01); *B01D 21/267* (2013.01); *E21B 7/15* (2013.01); *E21B 7/00* (2013.01)

(58) Field of Classification Search
CPC ............... E21B 21/08; E21B 7/15; E21B 7/00
See application file for complete search history.

(56) References Cited

U.S. PATENT DOCUMENTS

| | | | |
|---|---|---|---|
| 4,047,581 A | * | 9/1977 | Erickson ............... E21B 21/002 175/107 |
| 4,269,279 A | | 5/1981 | House |

(Continued)

FOREIGN PATENT DOCUMENTS

WO 2016/049108 A1 3/2016

OTHER PUBLICATIONS

International Search Report and Written Opinion issued in related PCT Application No. PCT/US2018/013175 mailed Oct. 19, 2018, 16 pages.

(Continued)

*Primary Examiner* — Nicole Coy
*Assistant Examiner* — Nicholas D Wlodarski
(74) *Attorney, Agent, or Firm* — DeLizio, Peacock, Lewin & Guerra, LLP (57) ABSTRACT

Methods and systems for managing dielectric properties of a pulsed power drilling fluid are provided. In one embodiment, the methods include introducing a drilling fluid into a drilling pipe that extends into a portion of a wellbore; separating the drilling fluid into a solids rich portion and a solids lean portion in the drilling pipe at a location proximate to a pulsed power drill bit; allowing the solids lean portion of the drilling fluid to flow through the pulsed power drill bit; and drilling at least a portion of a wellbore. In some embodiments, the methods and systems include passing the drilling fluid through one or more hydrocyclones. In some embodiments, the methods and systems include passing the drilling fluid through one or more centrifuges.

18 Claims, 8 Drawing Sheets

(51) Int. Cl.
*E21B 7/00* (2006.01)
*E21B 7/15* (2006.01)

(56) References Cited

U.S. PATENT DOCUMENTS

| | | | |
|---|---|---|---|
| 5,505,262 | A | 4/1996 | Cobb |
| 5,944,195 | A | 8/1999 | Huang et al. |
| 8,298,428 | B2 | 10/2012 | Hagen |
| 2006/0207798 | A1 | 9/2006 | Smith et al. |
| 2008/0110253 | A1 | 5/2008 | Stephenson et al. |
| 2009/0050374 | A1* | 2/2009 | Spiecker ............... E21B 21/002 175/48 |
| 2010/0147516 | A1 | 6/2010 | Betzer-Zilevitch |
| 2014/0209384 | A1 | 7/2014 | Hanson |
| 2014/0246054 | A1 | 9/2014 | Eia |
| 2018/0194987 | A1* | 7/2018 | Van Slyke ............... C09K 8/36 |

OTHER PUBLICATIONS

Zeng, Wenqing, and Xiong Dahe. "The latest application of SLon vertical ring and pulsating high-gradient magnetic separator." Minerals Engineering 16.6 (2003): 563-565.

\* cited by examiner

MANAGING DIELECTRIC PROPERTIES OF PULSED POWER DRILLING FLUIDS

CROSS-REFERENCE TO RELATED APPLICATION

The present application is a U.S. National Stage Application of International Application No. PCT/US2018/013175 filed Jan. 10, 2018, which is incorporated herein by reference in its entirety for all purposes.

BACKGROUND

The present disclosure relates to methods and systems for pulsed power drilling of subterranean formations.

Pulsed power drilling in subterranean formations involves using a drill bit on which one or more sets (pairs) of electrodes are disposed. The sets of electrodes are oriented along a face of the drill bit and disposed with a gap between each electrode in a set. In other words, the electrodes between which an electrical current passes through a mineral substrate (e.g., rock) are not on opposite sides of the rock. The passage of the electrical current between the electrodes of a set and through the rock causes it to break up. This process causes the rock to be broken up into monomineral grains. The process generally results in the faster generation of more and finer monomineral grains than with purely mechanical drilling processes.

In conventional rotary bit drilling, a drilling fluid is used, among other purposes, as a lubricant for the rotary drill bit and to carry drill cuttings. Pulsed power drilling, on the other hand, uses fundamentally different technology than rotary bit drilling to break apart rock and the drilling fluid used in pulse power drilling may serve other functions. Pulsed power drilling fluid is pumped through the downhole tool at the bottom of the wellbore being drilled and up through the annulus between the drill string and the wellbore. As with rotary bit drilling, the pulsed power drilling fluid may bring drill cuttings upward through the annulus and may provide a hydrostatic head to prevent a blowout. During pulsed power drilling, it may be advantageous to use an insulating liquid that has a high relative permittivity (dielectric constant) to shift the electric fields away from the liquid and into the rock in the region of the electrodes. However, insulating drilling fluid should provide high dielectric strength to provide high electric fields at the electrodes, low conductivity to provide low leakage current during the delay time from application of the voltage until the arc ignites in the rock, and high relative permittivity to shift a higher proportion of the electric field into the rock near the electrodes. Accordingly, a pulsed power drilling fluid will preferably have a high dielectric constant, low conductivity, high dielectric strength, and a long life under industrial or military application environments.

BRIEF DESCRIPTION OF THE DRAWINGS

These drawings illustrate certain aspects of some of the embodiments of the present disclosure, and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and systems for pulsed power drilling of subterranean formations. More particularly, the present disclosure relates to methods and systems for controlling one or more dielectric properties of a drilling fluid at a downhole location within a wellbore during drilling operations.

The present disclosure provides methods and systems for pulsed power drilling that include a solids removal tool coupled to a drilling pipe. The solids removal tool is located near the pulsed power drill bit and functions to remove certain low dielectric constant solids, such as weighting agents, from the drilling fluid before it contacts the pulsed power drill bit. The solids removed by the solids removal tool are fed to the annulus of the wellbore. The solids-lean portion of the drilling fluid (e.g., the portion of the drilling fluid from which solids have been removed) then collects drilling cuttings from the pulsed power drill bit and transports them uphole where they mix with the removed solids in the annulus before being transported back to the surface.

The solids removal tools and techniques used herein may include a solids removal tool coupled to a drill pipe. The solids removal tool may be coupled to the drill pipe between the pulsed power generator and a pulsed power drill bit. A "pulsed power drill bit" is a drill bit on which is disposed one or more sets of electrodes through which electrical energy is released into a rock using one or more high current pulses so that the rock is crushed or broken. The solids removal type may include a housing including an inlet and an outlet in fluid communication with an interior flowpath of the drill string. The solids removal tool of the present disclosure may generally be used to remove to separate a pulsed power drilling fluid into a solids rich portion and a solids lean portion. The solids lean portion may include a dielectric constant that is higher than a dielectric constant of the solids rich portion. A person of ordinary skill in the art would understand that the solids removal tool may separate the pulsed power drilling fluid using any suitable method known in the art. For example, the solids removal tool may include a mechanical separation technique, including, but not limited to, centrifuges, screens, filters, membranes, hydrocyclones, or any mechanism known in the art.

Among the many potential advantages to the methods and systems of the present disclosure, only some of which are alluded to herein, the methods and systems of the present disclosure may, among other benefits, control of the dielectric constant of a drilling fluid more precisely and/or efficiently than other methods and systems known in the art. The methods and systems of the present disclosure may also control of the dielectric constant at the pulsed power drill bit without compromising the other properties of the drilling fluid that are vital to the general operation of the drilling fluid. The methods and systems of the present disclosure generally allow for achieving high dielectric constants at the bit while also maintaining high density throughout the rest of the wellbore. This may allow a faster drilling operation without compromising wellbore integrity or safety such as by providing support for uncased portions of the wellbore, preventing well blowouts, and preventing the loss of formation fluids from the subterranean formation. The methods and systems of the present disclosure also may enable pulsed power drilling in high pressure wells where the procedure was previously unworkable. In some deeper and high pressure wells, high density fluids are required to contain the wellbore pressure and prevent wellbore influx or collapse. The required quantities of weighting material to achieve these higher densities can have a detrimental impact on the fluid's dielectric constant resulting in poor drilling efficiency or the inability to drill using pulsed power methods. Further, the methods and systems of the present disclosure may provide other advantages, such as increased equipment durability by allowing reduced equivalent circulating density and reduced abrasion at the drill bit.

While the making and using of various embodiments of the present disclosure are discussed in detail below, a person of ordinary skill in the art will appreciate that the present disclosure provides applicable inventive concepts that can be embodied in a variety of specific contexts. The specific embodiments discussed herein are illustrative of specific ways to make and use the disclosure and do not limit the scope of the present disclosure.

The present disclosure generally provides pulsed power breaking and drilling apparatuses and methods. As used herein, "drilling" is defined as excavating, boring into, making a hole in, or otherwise breaking and driving through a substrate. As used herein, "bit" and "drill bit" are defined as the working portion or end of a tool that performs a function such as, but not limited to, a cutting, drilling, boring, fracturing, or breaking action on a substrate (e.g., rock). As used herein, the term "pulsed power" is that which results when electrical energy is stored (e.g., in a capacitor or inductor) and then released into the load so that a pulse of current at high peak power is produced. "Electrocrushing" ("EC") is defined herein as the process of passing a pulsed electrical current through a mineral substrate so that the substrate is crushed or broken. The phrases "dielectric constant" or "relative permittivity" are used according to their standard meaning and are used interchangeably herein to refer to a dimensionless number that reflects the extent to which a medium concentrates electrostatic lines of flux. As would be understood by a person of ordinary skill in the art, relative permittivity is defined as the ratio of force between two charges separated by a certain distance in the medium to the force between the same two charges separated by the same distance in air. The phrase "dielectric strength" is used herein according to its standard meaning to describe an insulating material and is related to the maximum electric field that a material can withstand without breaking down (i.e., without experiencing failure of its insulating properties) typically reported in kV/cm.

The methods of the present disclosure provide a pulsed power drill bit on which one or more sets of electrodes is disposed. The sets of electrodes are oriented along a face of the drill bit and are disposed with a gap between each electrode in a set. In other words, the electrodes between which an electrical current passes through rock are not on opposite sides of the rock. The passage of the electrical current through the rock causes it to break up. This process causes the rock to be largely broken up into monomineral grains, and to a greater extent than with purely mechanical drilling processes. The pulsed power drill bits of the present disclosure may be stationary or they may rotate in a similar as traditional drill bits. A person of ordinary skill in the art would understand that in embodiments where the pulsed power drill bit rotates, the sets of electrodes may be combined with traditional mechanical teeth for faster and more efficient drilling.

Figure 6:
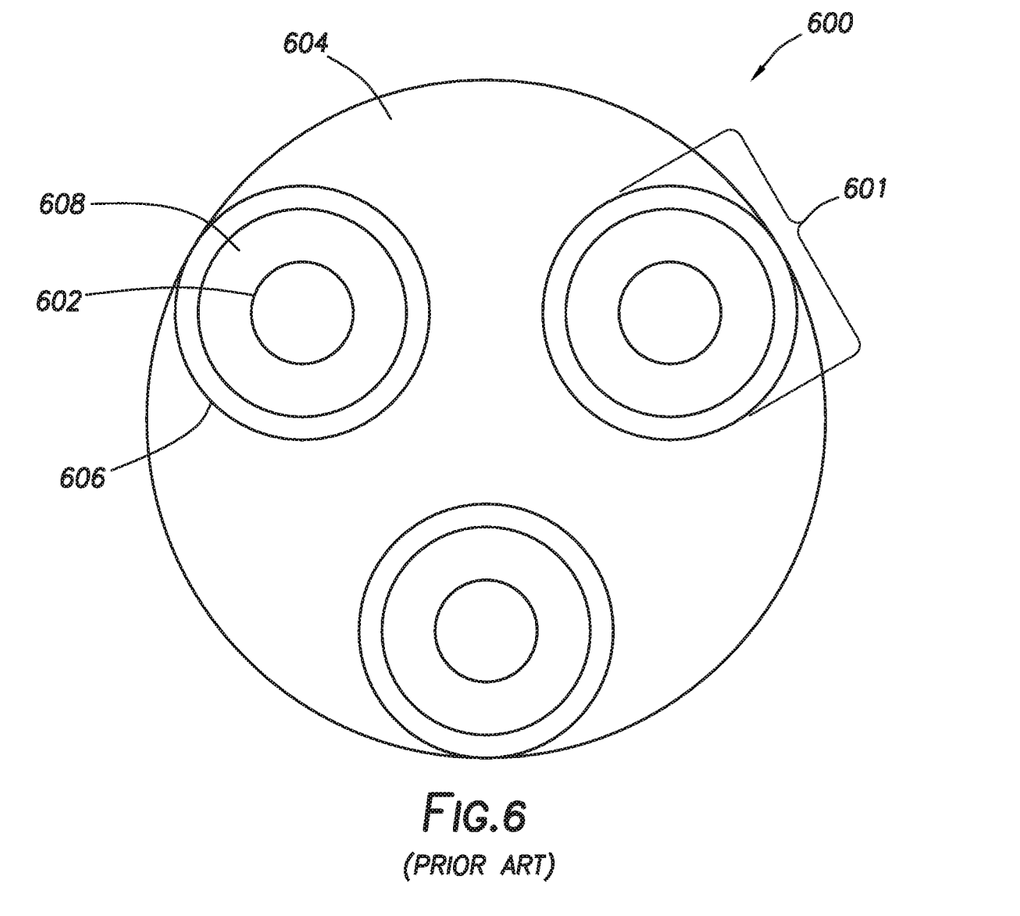
FIG. 6 is a diagram illustrating a flat pulsed power drilling bit.

FIG. 6 depicts a cross-section view of a pulsed power drill bit 600 in accordance with one or more embodiments of the present disclosure. Pulsed power drill bit 600 includes one or more sets (pairs) 601 of electrodes. Generally, but not necessarily, the sets 601 of electrodes are disposed on the bit such that at least one electrode contacts the rock to be fractured and another electrode that usually touches the rock but otherwise may be close to, but not necessarily touching, the rock so long as it is in sufficient proximity for current to pass through the rock. For example, one or more center electrodes 602 are disposed along the leading face 604 of pulsed power drill bit 600. Each center electrode 602 may be at least partially contained within one of the surrounding electrodes 606 disposed along the leading face 604 of pulsed power drill bit 600. The center electrodes 602 and surrounding electrodes 606 may be arranged so that one or more gaps 608 exist for generating an electrical arc in the rock. Center electrodes 602 may be the high-voltage electrodes and surrounding electrodes 606 may be the ground electrodes. As depicted in FIG. 6, ground electrodes are shown as completed circles. However, a person of ordinary skill in the art would understand that other embodiments may include ground electrodes are partial circles, partial or complete ellipses, or partial or complete parabolas in geometric form.

Typically, the electrode that need not touch the rock is the center electrode 602, not the surrounding electrode 606. It is not necessary that all electrodes touch the rock as the current is being applied. In accordance with certain embodiments, at least one of the electrodes may extend from the bit toward the rock to be fractured and may be compressible (i.e., retractable) into the drill bit by any means known in the art such as, for example, via a spring-loaded mechanism.

Therefore, the electrodes are disposed on a pulsed power drill bit and arranged such that electrocrushing arcs are created in the rock. Voltage pulses are applied repetitively to the electrodes on the bit to create repetitive electrocrushing excavation events. Pulsed power drilling can be accomplished, for example, with a flat-end cylindrical bit with one or more electrode sets. As depicted in FIG. 6, the one or more sets 601 of electrodes are arranged in a generally triangular shape along the leading face 604 of pulsed power drill bit 600. A person of ordinary skill in the art would understand that the sets 601 of electrodes may be included in any combination of quantity and physical arrangement to accommodate the needs of a specific pulsed power drilling operations. As depicted in FIG. 6, the one or more sets 601 of electrodes are arranged in a generally triangular shape along the leading face 604 of pulsed power drill bit 600. A person of ordinary skill in the art would understand that the sets 601 of electrodes may be included in any combination of quantity and arrangement to accommodate the needs of a specific pulsed power drilling operations. For example, these electrodes can be arranged in a coaxial configuration.

Figure 7:
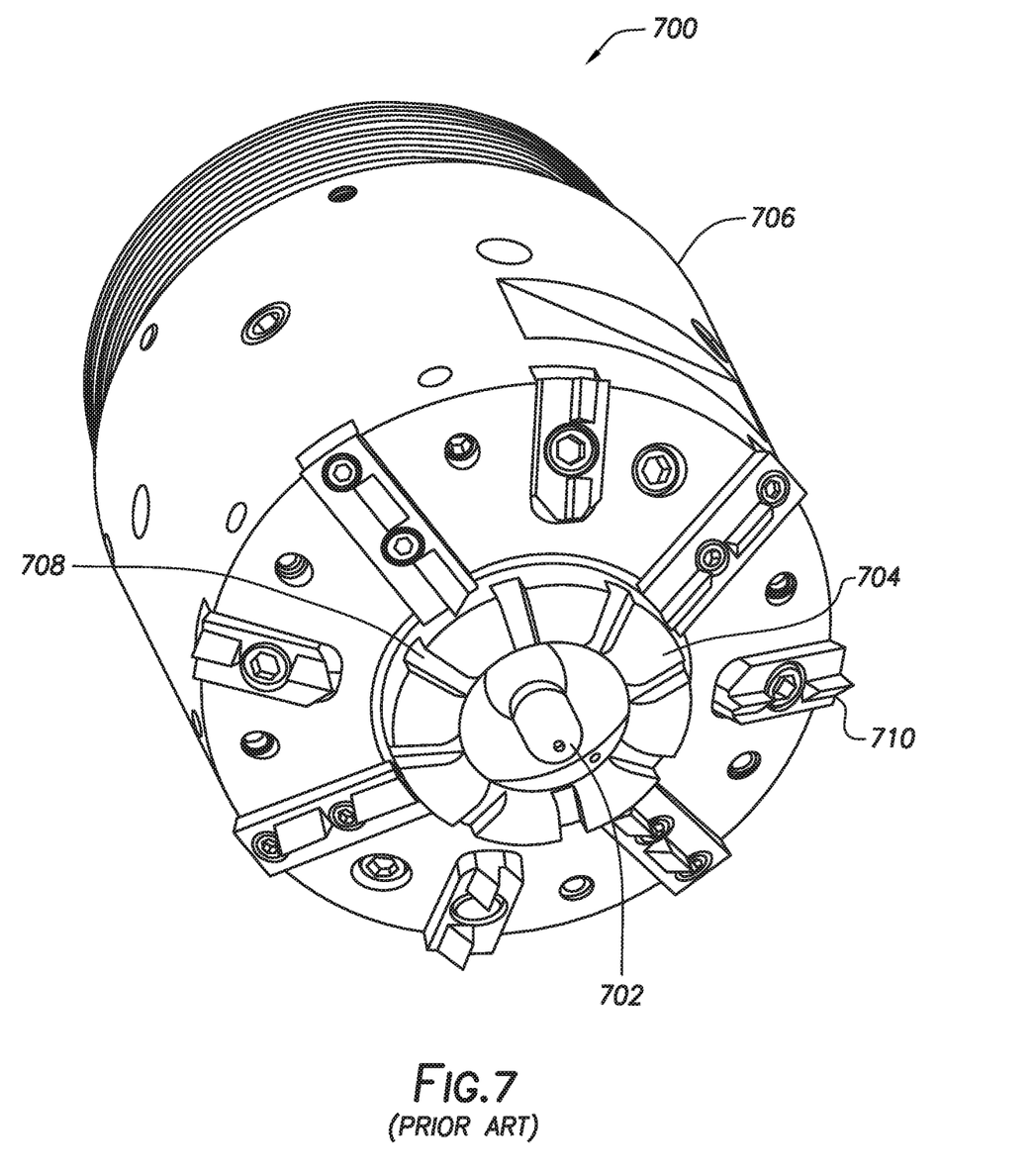
FIG. 7 is a diagram illustrating a conical pulsed power drilling bit.

It also may be advantageous to use a conical bit including one or more sets of electrodes for creating the electrocrushing arcs and mechanical teeth disposed along the conical portion of the bit to assist the electrocrushing process. FIG. 7 shows one embodiment of a pulsed power drilling bit shown using a conical bit arrangement. The conical pulsed power drill bit 700 has a single set of electrodes, preferably arranged coaxially on the bit. Conical bit 700 includes a center electrode 702, the surrounding electrode 704, the bit case or housing 706 and mechanical teeth 708 for drilling the rock. The surrounding electrode 704 preferably has mechanical cutting teeth 710 incorporated into the surface to smooth over the rough rock texture produced by the electrocrushing process. In this embodiment, the inner portion of the hole is drilled by the electrocrushing portion (i.e., electrodes 702 and 704) of the bit 700, and the outer portion of the hole is drilled by mechanical teeth 712. This results in faster drilling rates, because the mechanical teeth have good drilling efficiency at high velocity near the perimeter of the bit, but very low efficiency at low velocity near the center of the bit. The geometrical arrangement of the center electrode to the ground ring electrode is conical with a range of cone angles from 180 degrees (flat plane) to about 75 degrees (extended center electrode). Additionally, it may be advantageous to combine the pulsed power drilling bit of the present disclosure with one or more reamers. A reamer is wellbore drilling tool used to expand a portion of the wellbore at a location uphole from the drill bit. A person of ordinary skill in the art would understand that the present disclosure is well suited for use with any reamer technology known in the art.

Figure 8:
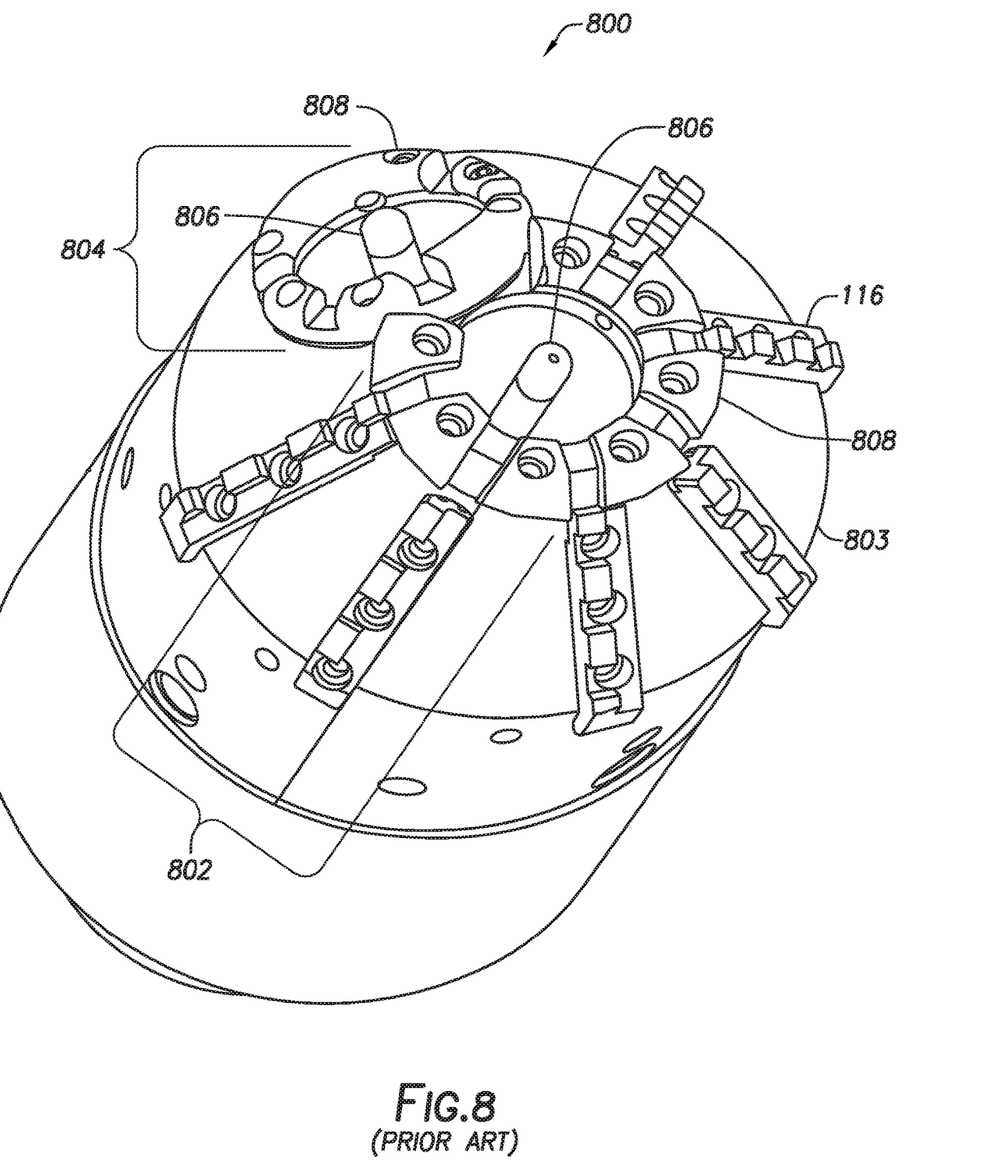
FIG. 8 is a diagram illustrating a conical pulsed power drilling bit.

Alternatively, one or more sets of electrodes may be disposed on the conical portion of the bit where a conical bit is used. FIG. 8 shows a conical pulsed power drill bit 800 including two sets of electrodes disposed along its outer surface. The pulsed power drill bit 800 includes a first set 802 of electrodes disposed along the central axis of the terminal end of bit casing 803. The pulsed power drill bit 800 also includes a second set 804 of electrodes disposed on the conical portion of the pulsed power drill bit. Each set of electrodes includes center electrode 806 and surrounding electrode 808. Pulsed power drill bit 800 may further include one or more mechanical teeth 814 extending radially from first set 802 of electrodes along the conical portion of bit casing 803. The combination of the conical surface on the bit and the asymmetry of the electrode sets may allow the dual-electrode bit to excavate more rock on one side of the hole than the other and thus to change direction. For drilling a straight hole, the repetition rate and pulse energy of the high voltage pulses to the electrode set on the conical surface side of the bit is maintained constant per degree of rotation. However, when the drill is intended to turn in a particular direction, then for that sector of the circle toward which the drill is to turn, the pulse repetition rate (and/or pulse energy) per degree of rotation is increased over the repetition rate for the rest of the circle. In this fashion, more rock is removed by the conical surface electrode set in the turning direction and less rock is removed in the other directions. Because of the conical shape of the bit, the drill tends to turn into the section where greater amount of rock was removed and therefore control of the direction of drilling is achieved.

Drilling fluids are typically classified according to their base material. In oil base drilling fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase.

Invert emulsion drilling fluids, i.e., emulsions in which a non-oleaginous fluid is the discontinuous phase and an oleaginous fluid is the continuous phase, are employed in drilling processes for the development of oil or gas sources, as well as, in geothermal drilling, water drilling, geoscientific drilling and mine drilling. Specifically, the invert emulsion fluids are often used for such purposes as providing stability to the drilled hole, forming a thin filter cake, lubricating the drilling bore and the downhole area and assembly, and penetrating salt beds without sloughing or enlargement of the drilled hole.

During a pulsed power drilling operation, a drilling fluid is pumped through the downhole tool at the bottom of the wellbore being drilled and up through the annulus between the drill string and the wellbore. The pulsed power drilling fluid brings drill cuttings upward through the annulus and provides a hydrostatic head to prevent a blowout. The pulsed power drilling fluid often is an insulating fluid with high dielectric constant (relative permittivity) to shift electric fields away from the liquid and into the rock in the region of the electrodes. The pulse power drilling fluid is often characterized by low conductivity to minimize leakage current.

As discussed above, it is advantageous to use an insulating liquid that has a high relative permittivity (dielectric constant) to shift the electric fields away from the liquid and into the rock in the region of the electrodes during pulsed power drilling. However, insulating drilling fluid must also provide high dielectric strength to provide high electric fields at the electrodes, low conductivity to provide low leakage current during the delay time from application of the voltage until the arc ignites in the rock, and high relative permittivity to shift a higher proportion of the electric field into the rock near the electrodes. Preferably, the insulating fluid has all of these properties: a high dielectric constant; a low conductivity; and a high dielectric strength; while also having a long life under industrial wellbore environments. In some embodiments, the fluid has an electrical conductivity less than 10-5 siemens (or "mho") per centimeter ("mho/cm") and a dielectric constant greater than about 6. In some embodiments, the drilling fluid includes having an electrical conductivity less than approximately 10-4 mho/cm and a dielectric constant greater than about 8.

One physical property of any drilling fluid that may be relevant carrying out the desired functions of the drilling fluid is its density. The density and depth of a column of drilling fluid determine the pressure exerted by the drilling fluid on the surrounding formation. In practice, the density of a drilling fluid may be controlled to exert sufficient downhole pressure to stabilize the walls of the borehole and prevent the inflow of oil or gas from formations that are pierced. In the extreme case, failure to maintain adequate fluid density can lead to a catastrophic, uncontrolled inflow of gas or oil known as a "blow-out". In some embodiments, the drilling fluids of the present disclosure will have a density of at least 14.0 pounds ("lbs") per gallon ("gal"). In some embodiments, the drilling fluid of the present disclosure will have a density of at least 18.0 lbs/gal.

In many drilling situations, the density of the fluid may be increased by adding so-called "weight materials" or "weighting agents." Weight materials include various inert, high-density particulate solid materials with a normal particle size smaller than 75 microns and preferably smaller than 50 microns. Finely ground barite, hematite and ilmenite are some examples of known weight materials.

Because large quantities of weight materials are often added to drilling fluids, the impact of a weight material on the flow properties (such as viscosity) of a drilling fluid is of major importance. Generally, the amount of weight material added to a fluid should have a minimum adverse increase in the resistance to flow of the fluid. There is also an upper limit to the amount of weight material that can be added to a drilling fluid before it becomes too thick to be of any practical use.

For pulsed power drilling, the addition of weight materials is of further concern because they generally have a lower dielectric constant than the rest of the drilling fluid. As discussed above, it is desirable for the insulating liquid surrounding the pulsed power drilling bit to have a high dielectric constant to focus the electric field into the subterranean formation. This problem may be compounded by the presence of solid drill cuttings which also have a relatively low dielectric constant.

The present disclosure provides methods and systems suitable to modify the drilling fluid downhole, thereby maintaining traditionally desirable drilling fluid properties (e.g., density and rheology) throughout the majority of the wellbore while raising the dielectric constant at the drill bit. The exemplary methods and systems disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods, treatment fluids, and/or additives may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
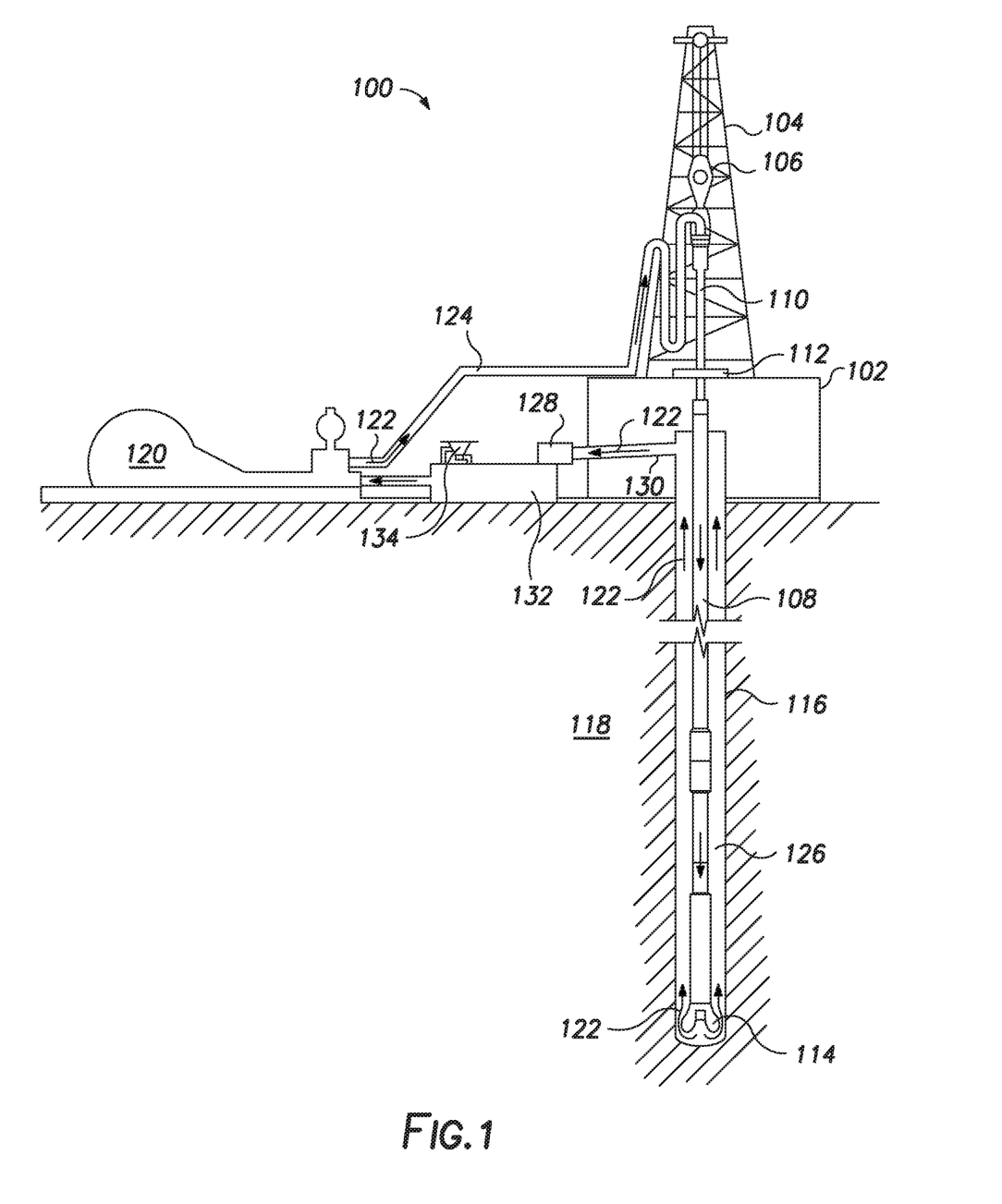
FIG. 1 is a diagram illustrating a pulsed power drilling assembly.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A pulsed power drill bit 114 is attached to the distal end of the drill string 108. Pulsed power drill bit 114 creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed additives may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed additives may be stored, reconditioned, and/or regulated until added to the drilling fluid 122.

As mentioned above, the disclosed treatment fluids and additives may directly or indirectly affect the components and equipment of the drilling assembly 100. For example, the disclosed fluids and additives may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, or the like. The fluid processing unit(s) 128 may further include one or more sensors, gauges, pumps, compressors, and the like used store, monitor, regulate, and/or recondition the fluids.

The disclosed methods, drilling fluids, and/or additives may directly or indirectly affect the pump 120, which representatively includes any conduits, pipelines, trucks, tubulars, and/or pipes used to fluidically convey the fluids and additives downhole, any pumps, compressors, or motors (e.g., topside or downhole) used to drive the fluids and additives into motion, any valves or related joints used to regulate the pressure or flow rate of the fluids and additives, and any sensors (i.e., pressure, temperature, flow rate, etc.), gauges, and/or combinations thereof, and the like. The disclosed fluids and additives may also directly or indirectly affect the mixing hopper 134 and the retention pit 132 and their assorted variations.

The disclosed methods, drilling fluids, and/or additives also may directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed methods, treatment fluids, and/or additives may also directly or indirectly affect any downhole heat exchangers, valves and corresponding actuation devices, tool seals, packers and other wellbore isolation devices or components, and the like associated with the wellbore 116. The disclosed methods, treatment fluids, and/or additives may also directly or indirectly affect the drill bit 114, which generally includes a pulsed power drilling bit in accordance with the descriptions provided above.

The disclosed methods, drilling fluids, and/or additives also may directly or indirectly affect the various equipment and/or tools (not shown) used at a well site or in drilling assembly 100 to detect various events, properties, and/or phenomena. Such equipment and/or tools may include, but are not limited to, pressure gauges, flow meters, sensors (e.g., float sensors used to monitor the level of drilling fluid in retention pit 132, downhole sensors, sensors in return flow line 130, etc.), seismic monitoring equipment, logging equipment, and the like.

While not specifically illustrated herein, the disclosed methods, drilling fluids, and/or additives may also directly or indirectly affect any transport or delivery equipment used to convey the compositions to the drilling assembly 100 such as, for example, any transport vessels, conduits, pipelines, trucks, tubulars, and/or pipes used to fluidically move the treatment fluids and/or additives from one location to another, any pumps, compressors, or motors used to drive the compositions into motion, any valves or related joints used to regulate the pressure or flow rate of the treatment fluids, and any sensors (i.e., pressure and temperature), gauges, and/or combinations thereof, and the like.

Figure 2:
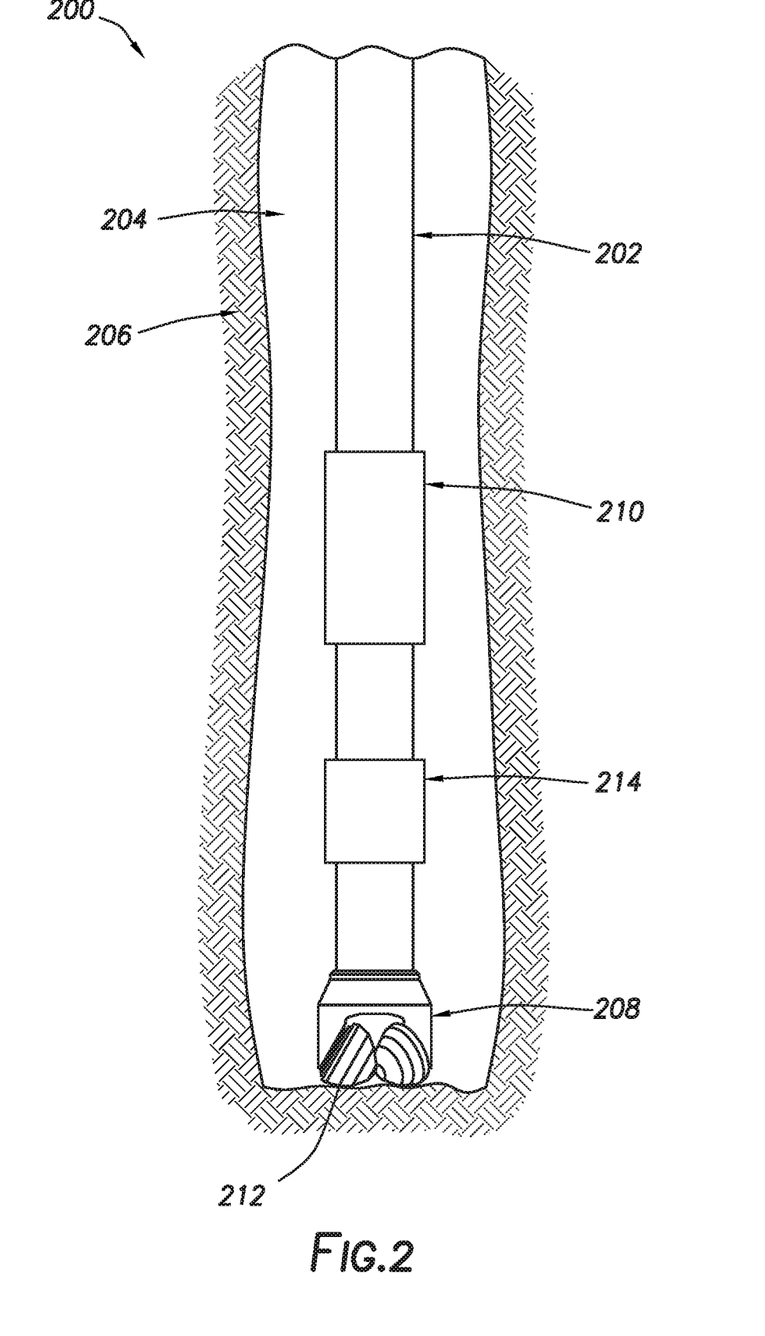
FIG. 2 is a diagram illustrating a close-up view of the downhole portion of a pulsed power drilling assembly in accordance with certain embodiments of the present disclosure.

FIG. 2 depicts a close-up view of drilling assembly 200. Drilling assembly 200 includes drilling pipe 202 disposed within wellbore 204 penetrating at least a portion of subterranean formation 206. Pulsed power drill bit 208 is coupled to the terminal end of drilling assembly 200. Drilling assembly 200 further includes a pulsed power generator 210 located along drilling pipe 202 at a location uphole from pulsed power drill bit 208. Pulsed power generator 210 is electrically coupled to pulsed power drill bit 208 and is used to generate the pulse of current at high peak power at pulsed power drill bit 208. As pulsed power generator 210 pulses current through pulsed power drill bit 208, the rock 212 of subterranean formation 206 located adjacent to pulsed power drill bit 208 is crushed or broken off from the remainder of subterranean formation 206. Drilling assembly 200 further includes a solids removal tool 214 disposed along drilling pipe 202 between pulsed power drill bit 208 and pulsed power generator 210.

Figure 3:
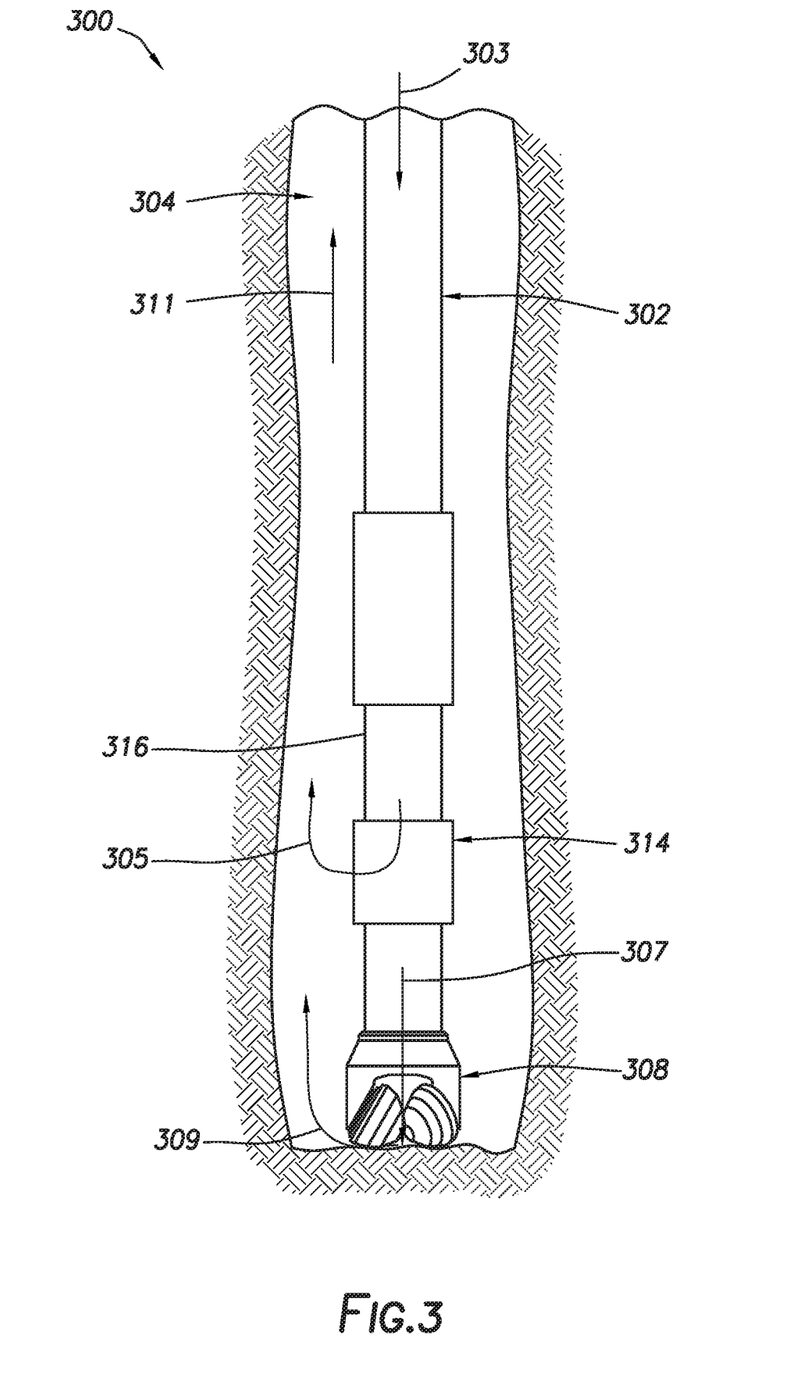
FIG. 3 is a diagram illustrating a close-up view of the downhole portion of a pulsed power drilling assembly in accordance with certain embodiments of the present disclosure.

FIG. 3 is a schematic view depicting the flow of a drilling fluid through drilling assembly 300. The drilling fluid passes through the interior of drilling pipe 302 from the surface along interior flowpath 303. The drilling fluid generally includes a base fluid and one or more additives, including one or more solid weight materials. The drilling fluid may include a single continuous phase. Alternatively, the drilling fluid may include a continuous phase and a disperse phase such as an oil-in-water emulsion or a water-in-oil ("invert") emulsion. The drilling fluid flows along interior flowpath 303 until it reaches solids removal tool 314. Solids removal tool 314 may remove, or lower the concentration of, the solids, including the low dielectric constant weight materials, from the remainder of the drilling fluid. By removing these low dielectric constant solids, the solids removal tool 314 increases the overall dielectric constant of the remainder of the drilling fluid. Solids removal tool 314 may separate the solids from the remainder of the drilling fluid using any method known in the art. A person of ordinary skill in the art would appreciate that there are many viable methods of removing the solids and this disclosure is not intended to limit those methods. Certain exemplary methods are described below in greater detail. After being separated from the remainder of the drilling fluids, the solids move along solids flowpath 305 from the interior of drilling pipe 302 (e.g., through an outlet (not shown) in the solids removal tool 314) to the annulus 316 of the wellbore 304. The remainder of the drilling fluid flows along insulating flowpath 307 to pulsed power drill bit 308. The remainder of the drilling fluid thereby serves to insulate pulsed power drill bit 308 and collect drill cuttings from the terminal end of drilling assembly 300. The fluid then travels along the drill tip flowpath 309 where it mixes with the solids removed in solids removal tool 314 in the annulus 316 of the wellbore 304. The combined mixture of the drilling fluid and drill cuttings, including the previously removed solids, travels along annular flowpath 311 out of wellbore 304 to a surface location (not shown in this figure).

Figure 4:
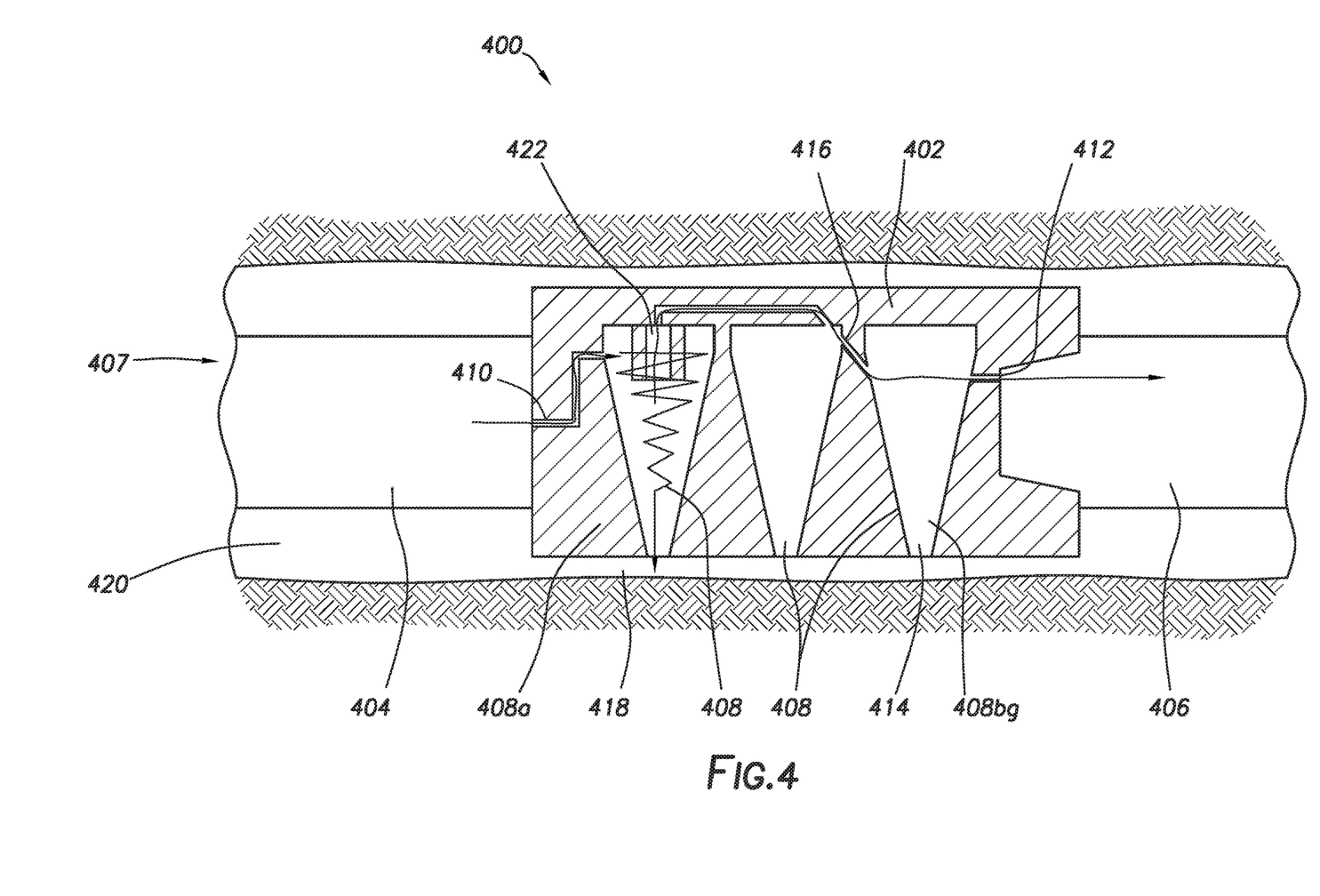
FIG. 4 is a diagram illustrating solids removal tool in accordance with certain embodiments of the present disclosure.

FIG. 4 is a schematic representation of a solids removal tool 400 in accordance with certain embodiments of the present disclosure. Solids removal tool 400 may generally include a housing 402 disposed along, and in fluid communication with, a first segment 404 and a second segment 406 of drilling pipe 407. Housing 402 includes an inlet 410 in fluid communication with the first segment 404 of drilling pipe 407 and an outlet 412 in fluid communication with the second segment 406 of drilling pipe 407. Housing 402 may further include one or more hydrocyclones 408 disposed within the interior of housing 402. The inlet 410 is in fluid communication with the first hydrocyclone 408a. The outlet 412 is in fluid communication with the last hydrocyclone 408b. Each hydrocyclone 408 includes a solids rich outlet 414 and a solids lean outlet 416. The solids rich outlet 414 of each hydrocyclone 408 fluidically communicates with the annulus 418 of the wellbore 420. The solids lean outlet 416 of each hydrocyclone 408 is fluidically coupled to each subsequent hydrocyclone 408, except for the solids lean outlet 416 of the last hydrocyclone 408b which is in fluid communication with the outlet 412 of housing 402.

As drilling fluid passes through solids removal tool 400, it flows through inlet 410 into housing 402. The drilling fluid then enters the first hydrocyclone 408a where it enters a centrifugal flowpath 422. Heavier weight solids are centrifugally separated from the rest of the fluid, creating a solids rich stream that exits the hydrocylone 408 through solids rich outlet 414. The solids lean portion of the fluid eventually exits the hydrocylone 408 through the solids lean outlet 416 where it is fed to the next hydrocyclone 408. A person of ordinary skill in the art would understand that the number, size, and general design of the hydrocyclones 408 may be varied depending on a number of different factors, including, but not limited to, the particular characteristics of a drilling fluid, the characteristics of the solids desired to be removed, the size of the drilling pipe 408, the flowrate of the drilling fluid, and the needs of the drilling operation. As the solids lean drilling fluid leaves the last hydrocyclone 408b, it flows through outlet 412 into the second segment 406 of drilling pipe 408. The drilling fluid now includes a higher dielectric constant and may be fed downhole to the pulsed power drill bit (not shown in this figure).

Figure 5:
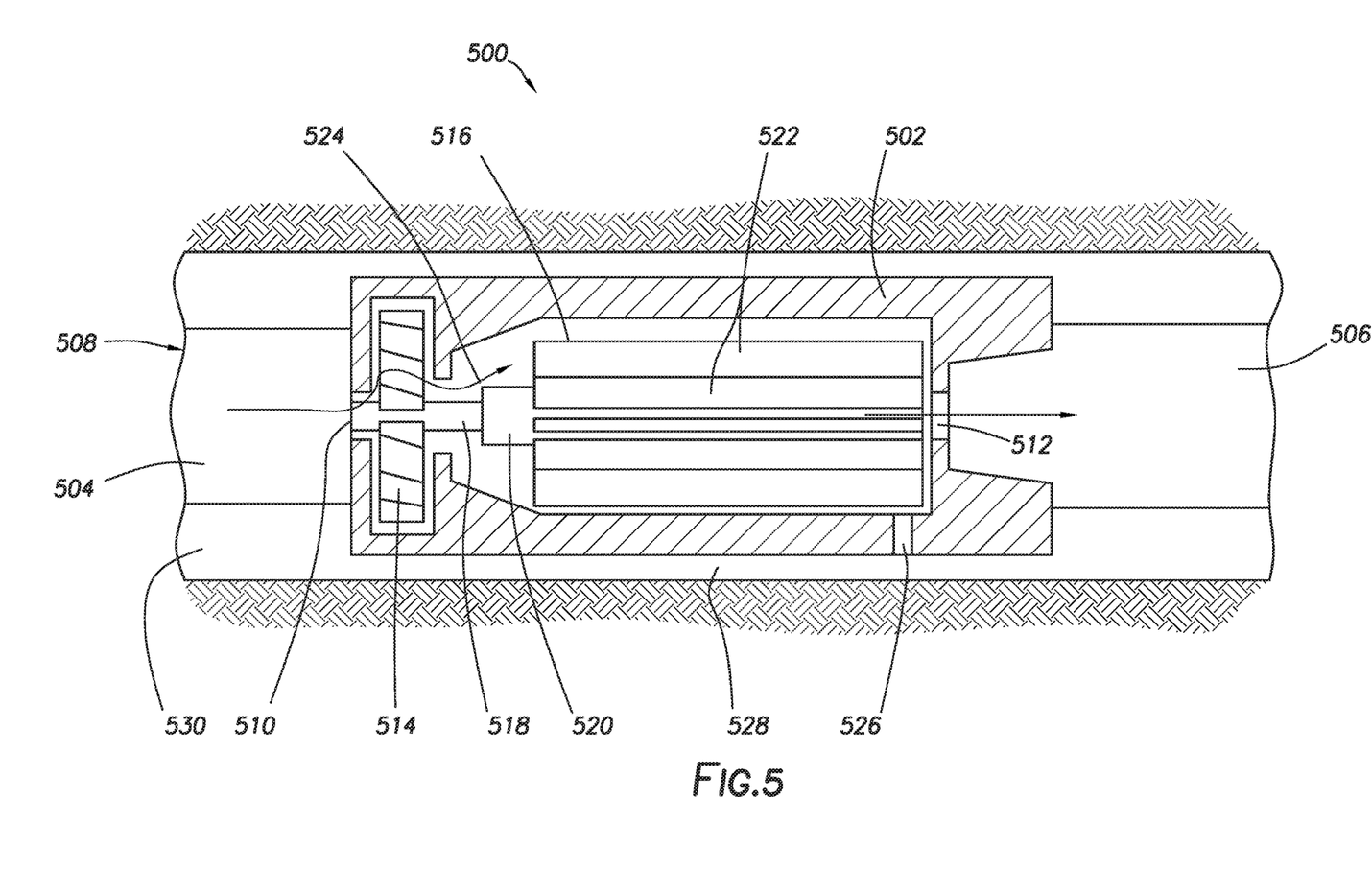
FIG. 5 is a diagram illustrating solids removal tool in accordance with certain embodiments of the present disclosure.

FIG. 5 is a schematic representation of another solids removal tool 500 in accordance with certain embodiments of the present disclosure. Solids removal tool 500 may generally include a housing 502 disposed along, and in fluid communication with, a first segment 504 and a second segment 506 of drilling pipe 508. Housing 502 includes an inlet 510 in fluid communication with the first segment 504 of drilling pipe 508 and an outlet 512 in fluid communication with the second segment 506 of drilling pipe 508. Solids removal tool 500 may further include a turbine 514 and centrifuge 516 disposed within housing 502. Turbine 514 is rotationally coupled to centrifuge 516 via drive shaft 518 running along a longitudinal axis 520 of both the turbine 514 and centrifuge 516. Turbine 514 includes a plurality of vanes 522 radiating outward from axis 520.

As drilling fluid passes through solids removal tool 400, it flows through inlet 410 into housing 402. The drilling fluid then enters the first hydrocyclone 408a where it enters a centrifugal flowpath 422. Heavier weight solids are centrifugally separated from the rest of the fluid, creating a solids rich stream that exits the hydrocyclone 408 through solids rich outlet 414. The solids lean portion of the fluid eventually exits the hydrocyclone 408 through the solids lean outlet 416 where it is fed to the next hydrocyclone 408. A person of ordinary skill in the art would understand that the number, size, and general design of the hydrocyclones 408 may be varied depending on a number of different factors, including, but not limited to, the particular characteristics of a drilling fluid, the characteristics of the solids desired to be removed, the size of the drilling pipe 407, the flowrate of the drilling fluid, and the needs of the drilling operation. As the solids lean drilling fluid leaves the last hydrocyclone 408b, it flows through outlet 412 into the second segment 406 of drilling pipe 407. The drilling fluid now includes a higher dielectric constant and may be fed downhole to the pulsed power drill bit (not shown in this figure).

An embodiment of the present disclosure is a method that includes: introducing a drilling fluid into a drilling pipe that extends into a portion of a wellbore; separating the drilling fluid into a solids rich portion and a solids lean portion in the drilling pipe at a location proximate to a pulsed power drill bit; allowing the solids lean portion of the drilling fluid to flow through the pulsed power drill bit; and drilling at least a portion of a wellbore.

In one or more embodiments described in the preceding paragraph, the step of separating the drilling fluid into a solids rich portion and a solids lean portion further includes increasing a dielectric constant of the solids lean portion. In one or more embodiments described above, the solids lean portion includes a dielectric constant of greater than about 6. In one or more embodiments described above, the method further includes transporting the solids rich portion to an annulus of the wellbore. In one or more embodiments described above, the step of separating the drilling fluid into a solids rich portion and a solids lean portion further includes passing the drilling fluid through one or more hydrocyclones. In one or more embodiments described above, the step of separating the drilling fluid into a solids rich portion and a solids lean portion further includes passing the drilling fluid through one or more centrifuges. In one or more embodiments described above, the one or more centrifuges are powered by the drilling fluid flowing through one or more turbines rotationally coupled to the centrifuges. In one or more embodiments described above, the method further includes using solids lean portion to remove a portion of drilling cuttings from the pulsed power drill bit. In one or more embodiments described above, the method further includes mixing the solids rich portion with the solids lean portion in at least a portion of the well bore and circulating the mixed solids rich portion and solids lean portion of the drilling fluid in the well bore to the surface.

Another embodiment of the present disclosure is a system that includes: a drill pipe disposed within a portion of a wellbore penetrating a subterranean formation; a pulsed power drill bit coupled to a terminal end of the drill pipe; a pulsed power generator coupled to the drill pipe at a location uphole from the pulsed power drill bit; and a solids removal tool coupled to the drill pipe between the pulsed power generator and the pulsed power drill bit.

In one or more embodiments described in the preceding paragraph, the solids removal tool includes a housing including an inlet and an outlet in fluid communication with an interior flowpath of the drill string. In one or more embodiments described above, the system further includes one or more hydrocyclones disposed within the housing and fluidically coupled to the inlet and the outlet of the housing. In one or more embodiments described above, the system further includes one or more solids rich outlets disposed along an exterior wall of the housing and fluidically coupling an interior of the housing and an annulus of the wellbore. In one or more embodiments described above, the system further includes one or more centrifuges disposed within the housing and fluidically coupled to the inlet and the outlet of the housing. In one or more embodiments described above, the system further includes one or more turbines disposed within the housing uphole from and rotationally coupled to the centrifuges. In one or more embodiments described above, the system further includes one or more solids rich outlets disposed along an exterior wall of the housing and fluidically coupling an interior of the housing and an annulus of the wellbore.

Another embodiment of the present disclosure is a method that includes: introducing a drilling fluid into a drilling pipe that extends into a portion of a wellbore; separating the drilling fluid into a solids rich portion and a solids lean portion in the drilling pipe at a location proximate to a pulsed power drill bit; separating the drilling fluid into a solids rich portion having a first dielectric constant and a solids lean portion having a second dielectric constant in the drilling pipe a location proximate to a pulsed power drill bit, wherein the second dielectric constant is greater than the first dielectric constant; allowing the solids lean portion of the drilling fluid to flow through the pulsed power drill bit; and drilling at least a portion of a wellbore.

In one or more embodiments described in the preceding paragraph, the second dielectric constant is greater than about 6. In one or more embodiments described above, the step of separating the drilling fluid into a solids rich portion having a first dielectric constant and a solids lean portion further includes passing the drilling fluid through one or more hydrocyclones. In one or more embodiments described above, the step of separating the drilling fluid into a solids rich portion having a first dielectric constant and a solids lean portion further includes passing the drilling fluid through one or more centrifuges Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The term "between" does not require that a component be adjacent to a first and second component as there may be other intervening components, structures, tools, etc. separating the three components. The terms in the claims have their plain, ordinary meaning unless otherwise explicitly and clearly defined by the patentee.

What is claimed is:

1. A method of controlling dielectric properties of a drilling fluid for a pulsed power drill bit installed in a wellbore, the method comprising:

installing a solids removal tool in a drilling pipe that extends into a portion of the wellbore, wherein the solids removal tool is installed uphole of the pulsed power drill bit;

introducing the drilling fluid into the drilling pipe, the drilling fluid including an insulating drilling liquid and a weighting agent, the weighting agent selected to manage wellbore pressure in the drilling fluid uphole of the solids removal tool, the insulating drilling liquid having a dielectric constant higher than a dielectric constant of the weighting agent and higher than a dielectric constant of the drilling fluid;

separating the drilling fluid introduced into the drilling pipe into a solids rich portion and a solids lean portion using the solids removal tool, the solids rich portion of the drilling fluid including a portion of the weighting agent, the solids lean portion of the drilling fluid having a dielectric constant higher than the dielectric constant of the drilling fluid and higher than the dielectric constant of the solids rich portion of the drilling fluid; and insulating the pulsed power drill bit with the solids lean portion of the drilling fluid introduced into the drilling pipe.

2. The method of claim 1, wherein the dielectric constant of the solids lean portion of the drilling fluid is greater than 6.

3. The method of claim 1, further comprising: transporting a portion of the weighting agent in the solids rich portion of the drilling fluid to an annulus of the wellbore.

4. The method of claim 1, wherein the solids removal tool includes one or more hydrocyclones.

5. The method of claim 1, wherein the solids removal tool includes one or more centrifuges.

6. The method of claim 5, wherein the one or more centrifuges are powered by the drilling fluid flowing through one or more turbines rotationally coupled to the centrifuges.

7. The method of claim 1, further comprising removing a portion of drilling cuttings from around the pulsed power drill bit using the solids lean portion of the drilling fluid.

8. The method of claim 7, wherein removing includes:
mixing the drilling cuttings removed by the solids lean portion of the drilling fluid with the solids rich portion of the drilling fluid to form a mixed fluid; and
circulating the mixed fluid upward in the wellbore.

9. A system comprising:
a solids removal tool;
a drill pipe connected to the solids removal tool, the drill pipe configured to receive a drilling fluid, the drill pipe disposed within a portion of a wellbore penetrating a subterranean formation, the drilling fluid including an insulating drilling liquid and a weighting agent, the weighting agent selected to manage wellbore pressure in the drilling fluid uphole of the solids removal tool, the insulating drilling liquid having a dielectric constant higher than a dielectric constant of the weighting agent and higher than a dielectric constant of the drilling fluid;
a pulsed power drill bit coupled to a terminal end of the drill pipe, the pulsed power drill bit configured to drill the borehole; and
a pulsed power generator coupled to the drill pipe at a location uphole from the pulsed power drill bit, the pulsed power generator configured to pulse current to the pulsed power drill bit when drilling, wherein the solids removal device separates the drilling fluid received at the drilling pipe into a solids rich portion and a solids lean portion, the solids rich portion of the drilling fluid including a portion of the weighting agent, the solids lean portion of the drilling fluid having a dielectric constant higher than the dielectric constant of the drilling fluid and higher than the dielectric constant of the solids rich portion of the drilling fluid, and wherein the pulsed power drill bit is configured to receive the solids lean portion of the drilling fluid and to allow the solids lean portion of the drilling fluid to flow through the pulsed power drill bit from the drill pipe during drilling.

10. The system of claim 9, wherein the tool comprises a housing comprising an inlet and an outlet in fluid communication with an interior flowpath of the drill string.

11. The system of claim 10, wherein the solids removal tool includes one or more hydrocyclones disposed within the housing and fluidically coupled to the inlet and the outlet of the housing.

12. The system of claim 11, further comprising one or more low dielectric outlets disposed along an exterior wall of the housing and fluidically coupling an interior of the housing and an annulus of the wellbore.

13. The system of claim 10, wherein the solids removal tool includes one or more centrifuges disposed within the housing and fluidically coupled to the inlet and the outlet of the housing.

14. The system of claim 13, wherein the solids removal tool further includes one or more turbines disposed within the housing uphole from and rotationally coupled to the centrifuges.

15. The system of claim 13, further comprising one or more low dielectric outlets disposed along an exterior wall of the housing and fluidically coupling an interior of the housing and an annulus of the wellbore.

16. A method comprising:
introducing a drilling fluid into a drilling pipe that extends into a portion of a wellbore such that the drilling fluid passes through a solids removal tool before passing downstream to a pulsed power drill bit, the drilling fluid including an insulating drilling liquid and a weighting agent, the weighting agent selected to manage wellbore pressure uphole of the solids removal tool;
applying the drilling fluid to the solids removal tool to remove a portion of the weighting agent from the drilling fluid introduced into the drilling pipe, separating the drilling fluid into a solids rich portion and a solids lean portion, the solids rich portion of the drilling fluid including the portion of the weighting agent removed by the solids removal tool, the solids lean portion of the drilling fluid having a higher dielectric constant than a dielectric constant of the drilling fluid introduced into the drill pipe and a higher dielectric constant than a dielectric constant of the solids rich portion of the drilling fluid; and
insulating the pulsed power drill bit with the solids lean portion of the drilling fluid while drilling at least a portion of the wellbore.

17. The method of claim 16, wherein the solids removal tool includes one or more hydrocyclones.

18. The method of claim 16, wherein solids removal tool includes one or more centrifuges.

* * * * *